April 19, 1932.   F. W. BAKER   1,854,728
DISK WHEEL
Filed Jan. 20, 1928   2 Sheets-Sheet 2
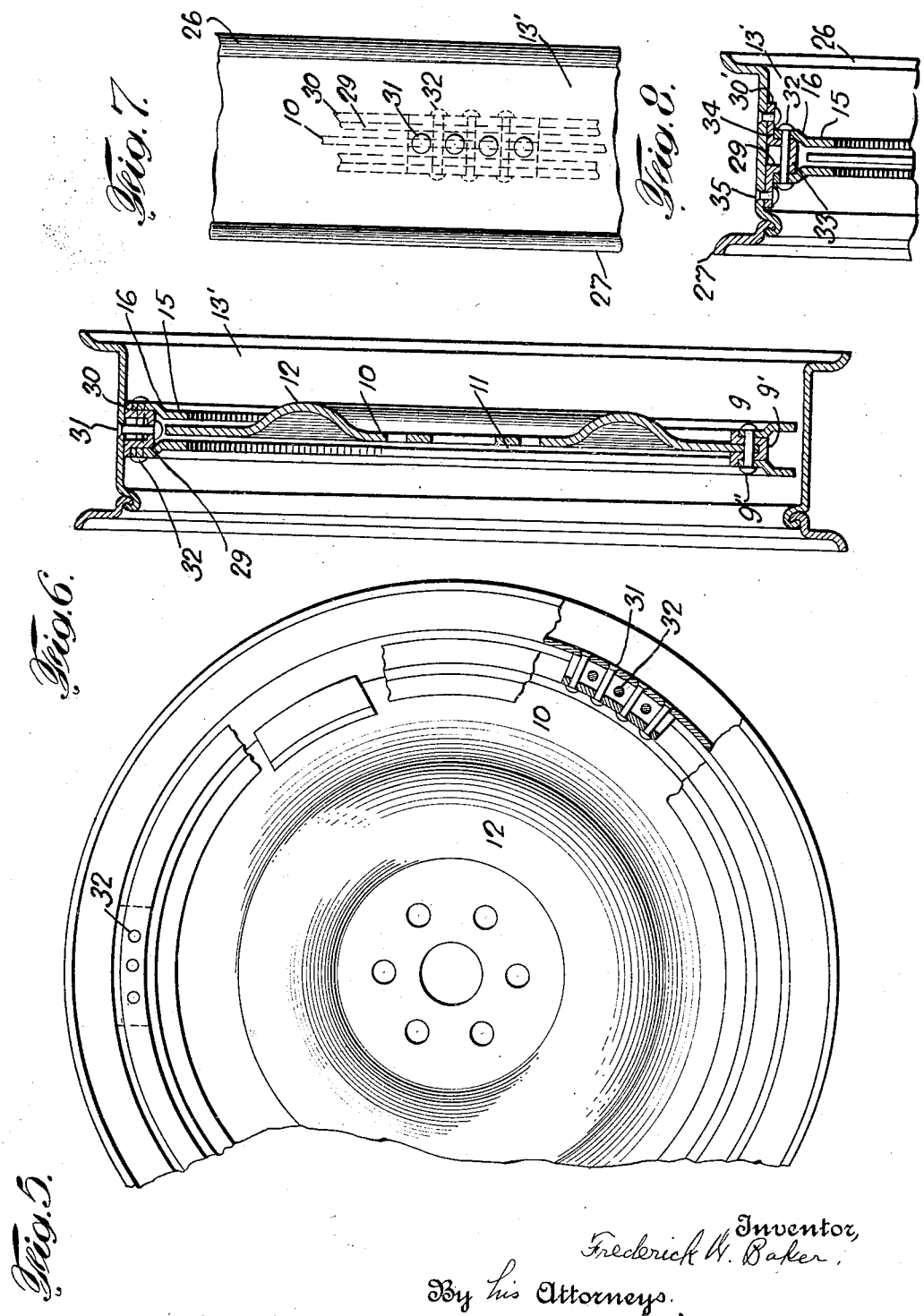
Inventor,
Frederick W. Baker.
By his Attorneys.
Hoguet & Neary Patented Apr. 19, 1932

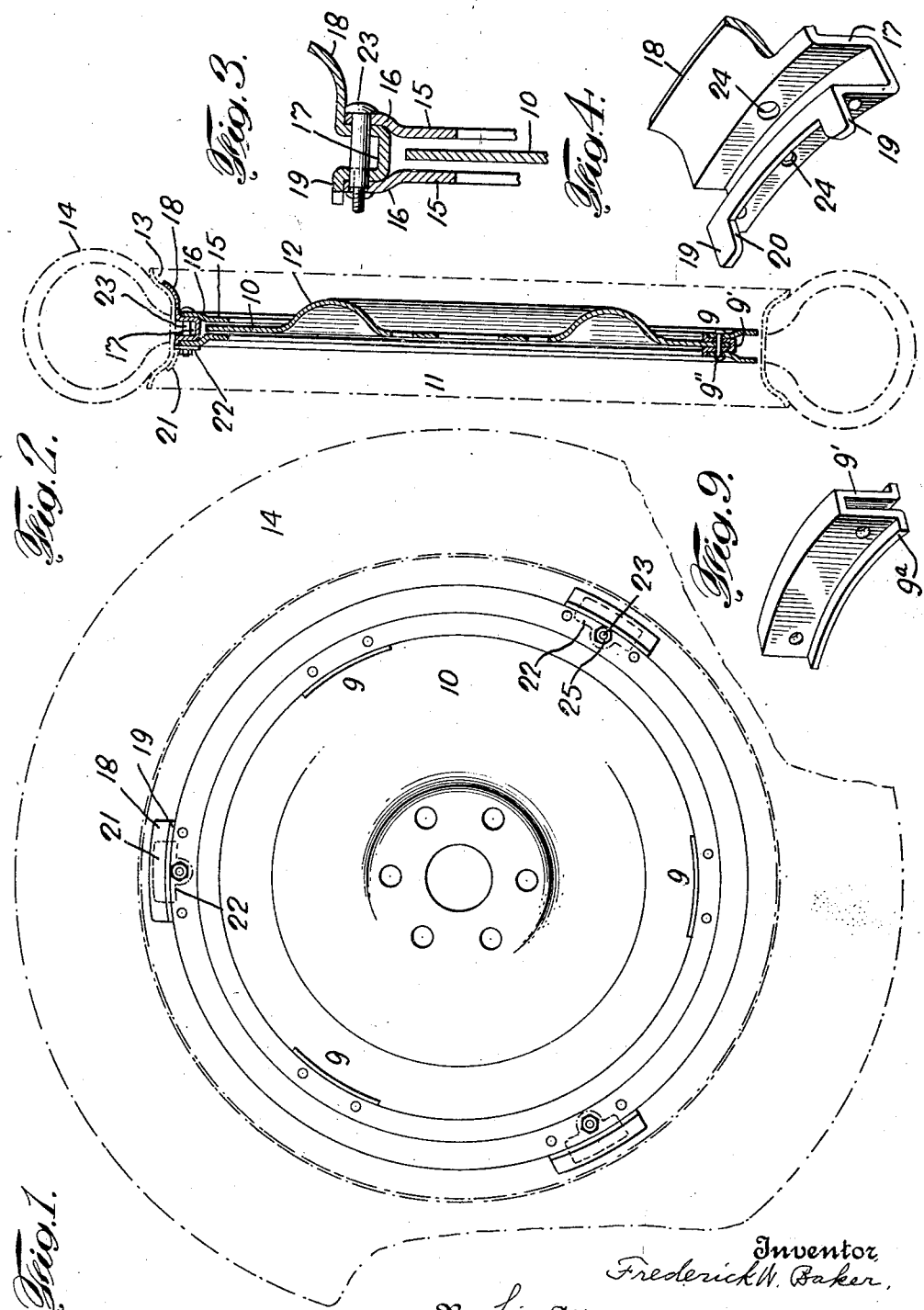

1,854,728

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

DISK WHEEL

Application filed January 20, 1928. Serial No. 248,018.

My invention relates to improvements in disk wheels, and particularly such as are used on motor cars. The object of my invention is to produce a simple, highly resilient and yet exceptionally strong disk wheel. A further object of my invention is to provide means for attaching the wheel disk to the rim at equi-distant points around the periphery of the disk, so as to produce a resilient support for a shoe or tire between such points of suspension, after the general teaching of my reissue patent of the United States No. 16,287, dated March 9th, 1926. In carrying out this idea and applying the spaced suspension theory to a disk wheel I provide a connecting medium between the rim and disk so that this connecting medium is applied to the disk at spaced intervals, thus making the connection strong but resilient. My invention is intended to provide a very practical way of carrying this idea into effect, and in general to produce a strong, cheap, and exceedingly resilient wheel.

Reference is to be had to the accompanying drawings forming a part of this specification, in which similar reference characters indicate corresponding parts in all the views.

Figure 1 is a broken side elevation of a wheel showing my improvements.

Figure 2 is a cross section thereof.

Figure 3 is a broken cross section showing in detail the connection between the disk and rim.
Figure 4 is a broken detail perspective of one of the clips used in making the rim connection.

Figure 5 is a side elevation with parts broken away and with other parts in section, of a slightly modified form of the wheel.

Figure 6 is a cross section of the wheel shown in Figure 5.

Figure 7 is a broken face view of a part of the wheel rim shown in Figure 6.
Figure 8 is a detail section showing another means of making the rim connection with the inner wheel parts, and Figure 9 is a detail of a saddle connecting with the wheel disk.
The wheel disk 10 may be conventional or of any desired structure, and I have illustrated it having the inturned hub parts 11 and an annular corrugation 12 to give it additional radial resilience, and at the same time to stiffen it against lateral flexing. In Figure 2 I have shown the disk having a conventional rim 13 adapted to carry the customary shoe 14. To provide for the desired connection between the disk and rim, I employ spaced rings 15 which straddle the peripheral part of the disk as shown in the drawings, and these rings are spread slightly at their outer parts as shown at 16, so as to receive between them at spaced intervals, preferably three in number, the U shaped clips 17, each of which has an outwardly extending flange 18 shaped to fit against the rim 13 on one side, and the clip has on the opposite part a side flange 19 which also abuts with the rim and which is notched as shown at 20 in Figure 4 to receive a narrower flange 21 which abuts with the rim 13 as shown in Figure 2. The notch 20 in each clip serves to prevent displacement of the flange member 21, and the latter has an inwardly extending portion 22 which lies against one of the rings 15, and the parts are all riveted or welded together. As shown they are connected by bolts 23 which extend through the two rings 15 near their outer peripheries, through the clips 17, and also through the part 22 of the member 21. The walls of the clip 17 are perforated as at 24 to receive the bolts 23, and each can be locked by a nut 25. It is evident that rivets can be substituted for the bolts 23. Thus the parts can all be secured together and it will be noticed that the outer peripheries of the rings 15 abut with the inner walls of the parts 18 and 19, while the inner parts of each clip 17 abut with the parts 16 of the ring 15. Thus a very strong and simple connection is made, and one in which the parts can be easily separated when desired.

It will be noticed that this connection is preferably at three points as shown in Figure 1, and at equidistant places between those just referred to, the rings 15 are secured to the disk 10, these places being indicated in Figure 1 by the numeral 9. The disk and rings can be fastened together in any convenient way, but preferably cradle shaped saddles 9' fit between the rings 15, receive the edge of the disk 10, and rivets or equivalent fastenings 9'' pass through the rings and saddles. The saddles also have flanges 9a which abut with the inner edges of the rings 15.

Thus it will be seen that the disk is attached to the rings 15 at spaced intervals, preferably three in number, and that at other points there are no fastenings between the disk and rings, and it will be noticed that the fastenings between the rings and rim are also in spaced relation and located midway between the fastenings 9. Thus strain will be distributed to all parts of the disk because of the spaced fastenings above referred to.

In Figures 5 to 7 I have shown slight modifications of the invention. As here illustrated the type of rim is somewhat different, and the rim 13' has conventional flanges 26 and 27, the latter being removable as shown, but any suitable flanges or rims can be used. The rings 15—16 are used as before, but the clip 29 which extends between the rings at spaced intervals is of generally rectangular cross section, having flanges 30 which abut with the flat part of the rim on their outer faces and with the peripheries of the rings 15 on their inner faces. The clips 29 are riveted to the rim by rivets 31 radially arranged, and rivets 32 laterally arranged. Of course other fastenings can be substituted, but this makes a very strong connection.

In Figure 8 a clip 33 like the clip 29 in its middle section is used, and the rivets or equivalent fastenings 32 are also employed, but the clip 33 has wider side flanges 34 which are complementary to the inner wall of the rim 13' and are riveted thereto as shown at 35. The fastenings 9 connecting the rings 15 and the disk 10 are substantially as already described. In any event I get the spaced suspension between the rim and disk referred to in my prior patent above mentioned and have a disk wheel of unusual strength and resilience.

By reference to the drawings it will be seen that the rings 15 serve as a connecting element between the disk 10 and the rim 13 or 13', that the connecting element is secured to the rim at spaced intervals only, and that the connecting element or ring is connected to the disk at other spaced intervals symmetrically arranged between the fastenings of the rim and connecting element, so that there is never any direct radial thrust on the wheel between its hub and rim, but the shocks and strains are distributed through the various parts of the rim, connecting element and disk as already described.

I claim:—

1. A vehicle wheel comprising a wheel disk, spaced rings associated with the periphery of the disk, and attached to the disk at three symmetrically spaced points only, a rim, and supporting members connected to the rim and to the spaced rings in staggered relation to the connections between said rings and the disk.

2. A vehicle wheel comprising a wheel disk, spaced rings associated with the periphery of the disk and connected to the disk at widely separated symmetrically arranged points only, whereby resilience is established in the spaced rings between the points of attachment, a rim, and supporting members connecting the rim with the aforesaid spaced rings at points between those where the said rings are attached to the disk.

3. A vehicle wheel comprising a wheel disk, saddles associated with and straddling the periphery of the disk, a pair of rings attached to the saddles at symmetrically arranged but remotely spaced places thereby leaving resilience in the rings between said points of attachment, said rings being disposed on opposite sides of the periphery of said disk, a rim, and supporting members connecting the rim with the aforesaid rings and located at points between those at which the rings connect with the saddles.

4. A vehicle wheel comprising a wheel disk, spaced rings associated with and enclosing therebetween the periphery of said disk, said rings being attached to said disk at symmetrically arranged, remotely spaced points, thereby leaving resilience in the rings between said points, a rim, and means for connecting said rim with said rings at points between said first mentioned points.

5. A vehicle wheel comprising a wheel disk, saddles associated with and straddling the periphery of the disk, a pair of rings attached to the saddles at at least three symmetrically arranged but remotely spaced places thereby leaving resilience in the rings between said points of attachment, said rings being disposed on opposite sides of the periphery of said disk, a rim, and supporting members connecting the rim with the aforesaid rings and located at points between those at which the rings connect with the saddles.

6. A vehicle wheel comprising a wheel disk, spaced rings associated with and inclosing therebetween the periphery of said disk, said rings being attached to said disk at at least three symmetrically arranged remotely spaced points, thereby leaving resilience in the rings between said points, a rim, and means for connecting said rim with said rings at points between said first mentioned points.

In testimony whereof, I have signed my name to this specification this 18th day of January, 1928.

FREDERICK WILLIAM BAKER.